United States Patent
Freeston

(10) Patent No.: US 11,699,288 B2
(45) Date of Patent: *Jul. 11, 2023

(54) AUTOMATED DETECTION OF FEATURES AND/OR PARAMETERS WITHIN A WATER ENVIRONMENT USING IMAGE DATA

(71) Applicant: SURFLINE\WAVETRAK, INC., Huntington Beach, CA (US)

(72) Inventor: Benjamin Freeston, Laguna Niguel, CA (US)

(73) Assignee: SURFLINE\WAVETRAK, INC., Huntington Beach, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/142,044

(22) Filed: Jan. 5, 2021

(65) Prior Publication Data
US 2021/0124902 A1 Apr. 29, 2021

Related U.S. Application Data

(63) Continuation of application No. 16/551,341, filed on Aug. 26, 2019, now Pat. No. 10,891,481, which is a
(Continued)

(51) Int. Cl.
*G06T 7/00* (2017.01)
*G06V 20/00* (2022.01)
(Continued)

(52) U.S. Cl.
CPC .............. *G06V 20/38* (2022.01); *G06N 20/00* (2019.01); *G06T 7/223* (2017.01); *G06T 7/246* (2017.01);
(Continued)

(58) Field of Classification Search
CPC ...... G06V 20/13; G06V 20/182; G06V 20/44; G06V 20/52; G06V 20/38; G06N 20/00; G06T 7/223; G06T 7/246; G06T 7/70
See application file for complete search history.

(56) References Cited

U.S. PATENT DOCUMENTS

| 10,055,648 B1 | 8/2018 | Grigsby et al. |
| 2008/0021928 A1 | 1/2008 | Yagnik |

(Continued)

OTHER PUBLICATIONS

International Search Report and Written Opinion dated Jun. 17, 2019 for related International Application No. PCT/US2019/027556, in 8 pages.
(Continued)

*Primary Examiner* — Ping Y Hsieh
(74) *Attorney, Agent, or Firm* — Procopio, Cory, Hargreaves & Savitch LLP

(57) ABSTRACT

Automated detection of features and/or parameters within an ocean environment using image data. In an embodiment, captured image data is received from ocean-facing camera (s) that are positioned to capture a region of an ocean environment. Feature(s) are identified within the captured image data, and parameter(s) are measured based on the identified feature(s). Then, when a request for data is received from a user system, the requested data is generated based on the parameter(s) and sent to the user system.

19 Claims, 4 Drawing Sheets

Related U.S. Application Data continuation of application No. 16/192,237, filed on Nov. 15, 2018, now Pat. No. 10,430,654, and a continuation of application No. 16/191,853, filed on Nov. 15, 2018, now Pat. No. 10,395,114.

(60) Provisional application No. 62/660,820, filed on Apr. 20, 2018, provisional application No. 62/660,809, filed on Apr. 20, 2018, provisional application No. 62/660,809, filed on Apr. 20, 2018, provisional application No. 62/660,820, filed on Apr. 20, 2018.

(51) Int. Cl.
  *G06T 7/246* (2017.01)
  *G06T 7/70* (2017.01)
  *G06T 7/223* (2017.01)
  *G06N 20/00* (2019.01)
  *G06V 20/10* (2022.01)
  *G06V 20/52* (2022.01)
  *G06V 20/40* (2022.01)

(52) U.S. Cl.
  CPC .............. *G06T 7/70* (2017.01); *G06V 20/182* (2022.01); *G06V 20/52* (2022.01); *G06V 20/44* (2022.01)

(56) References Cited

U.S. PATENT DOCUMENTS

| | | | |
|---|---|---|---|
| 2013/0016899 A1 | 1/2013 | Li et al. | |
| 2015/0058323 A1* | 2/2015 | Bailey | G06F 3/017 707/736 |
| 2015/0335948 A1* | 11/2015 | Helm | A61B 5/1118 700/91 |
| 2015/0341139 A1* | 11/2015 | Bradley | G06F 21/6209 348/143 |
| 2016/0104059 A1* | 4/2016 | Wang | G06V 10/40 382/103 |
| 2016/0203696 A1* | 7/2016 | Suzuki | G06F 17/18 73/170.31 |
| 2017/0235015 A1* | 8/2017 | Dhont | G06T 11/60 382/109 |
| 2018/0310532 A1 | 11/2018 | Hickson et al. | |

OTHER PUBLICATIONS

Green, Patrick, "Investigation into the use of surf web cameras to improve the accuracy of forecasting wave behavior", 4th Year Project Report, Computer Science and Physics School of Informatics, University of Edinburgh (2017), in 60 pages.

Examination report No. 1 for standard patent application for related Australian Patent Application No. 2019257323 dated Dec. 6, 2019, in 5 pages.

Examination Report for AU Application No. 2022201244 dated Feb. 15, 2023 (4 pages).

* cited by examiner

AUTOMATED DETECTION OF FEATURES AND/OR PARAMETERS WITHIN A WATER ENVIRONMENT USING IMAGE DATA

CROSS-REFERENCE TO RELATED APPLICATIONS

This application is a continuation of U.S. patent application Ser. No. 16/551,341, filed on Aug. 26, 2019, which is a continuation of U.S. patent application Ser. No. 16/191,853, filed on Nov. 15, 2018, and U.S. patent application Ser. No. 16/192,237, filed on Nov. 15, 2018, which both claim priority to U.S. Provisional Patent App. No. 62/660,820, filed on Apr. 20, 2018, and U.S. Provisional Patent App. No. 62/660,809, filed on Apr. 20, 2018, which are all hereby incorporated herein by reference as if set forth in full.

BACKGROUND

Field of the Invention

The embodiments described herein are generally directed to automated detection within an ocean environment using image data, and, more particularly, to automatically detecting features (e.g., recreational activities, such as surfing) or parameters (e.g., statistics, such as the number of activities performed, and/or environmental measures, such as surface displacement, ocean current speed, strength, and/or direction, wind speed, strength, and/or direction, quantity, location, and/or height of sand, etc.) in at least a region of an ocean environment.

Description of the Related Art

When determining whether or not to head to the beach or to which beach to head, recreational ocean users (e.g., surfers) are influenced by ocean conditions, including surf conditions (e.g., wave height, wave frequency, etc.), ocean currents, wind, and the presence or number of other beachgoers. Accurately gauging the conditions at a number of different beaches, in order to identify the best beach to visit (e.g., for a recreational activity), can be an important part of a beachgoer's planning process.

Ocean-facing cameras can be used to provide potential beachgoers with video footage of a beach (e.g., via a real-time webcam). However, in order to properly assess ocean conditions from such a real-time video, a person would need to study the video footage for a long time. Even then, the information that is capable of being gathered from human assessment is severely limited in amount and quality (e.g., accuracy) and is prone to error.

For example, waves often arrive in groups, sometimes with long intervals between arrivals. Gauging beach conditions from a webcam can require watching ten or more minutes of video footage. Potential beachgoers, who wish to monitor multiple beaches, will have to repeat this exercise for each beach. Therefore, the planning process is tedious and time-consuming.

SUMMARY

Accordingly, systems, methods, and non-transitory computer-readable media are disclosed for automated detection of features and/or parameters within an ocean environment.

In an embodiment, a method is disclosed. The method comprises using at least one hardware processor to: for each of one or more ocean-facing cameras that are positioned to capture image data of a region of an ocean environment, receive the captured image data via at least one network, identify one or more features within the captured image data, and measure one or more parameters of the ocean environment based on the identified one or more features within the captured image data; and, for each of one or more user systems, receive a request for data from the user system via the at least one network, generate the requested data based on the one or more parameters, and send the requested data to the user system via the at least one network. The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for automated detection of features and/or parameters within an ocean environment. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
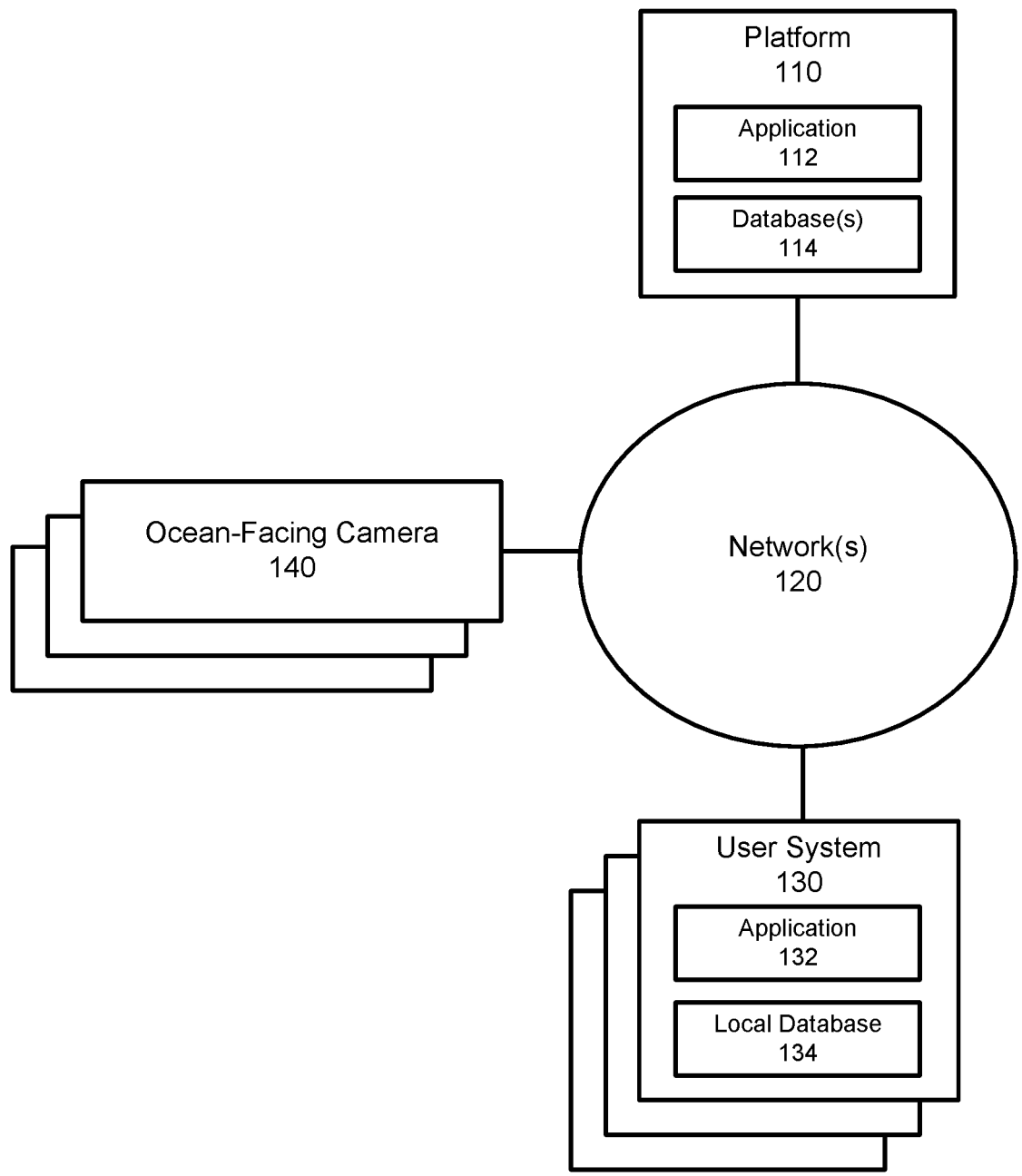
FIG. 1 illustrates an example infrastructure, in which one or more of the processes described herein, may be implemented, according to an embodiment.

FIG. 1 illustrates an example system for automated detection of features and/or parameters within an ocean environment, according to an embodiment. The infrastructure may comprise a platform 110 (e.g., one or more servers) which hosts and/or executes one or more of the various functions, processes, methods, and/or software modules described herein. Platform 110 may comprise dedicated servers, or may instead comprise cloud instances, which utilize shared resources of one or more servers. These servers or cloud instances may be collocated and/or geographically distributed. Platform 110 may also comprise or be communicatively connected to a server application 112 and/or one or more databases 114. In addition, platform 110 may be communicatively connected to one or more user systems 130 via one or more networks 120. Platform 110 may also be communicatively connected to one or more ocean-facing cameras 140 via one or more networks 120.

Network(s) 120 may comprise the Internet, and platform 110 may communicate with user system(s) 130 and/or ocean-facing cameras 140 through the Internet using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols. While platform 110 is illustrated as being connected to various systems through a single set of network(s) 120, it should be understood that platform 110 may be connected to the various systems via different sets of one or more networks. For example, platform 110 may be connected to a subset of user systems 130 and/or ocean-facing cameras 140 via the Internet, but may be connected to one or more other user systems 130 and/or ocean-facing cameras 140 via an intranet. Furthermore, while only a few user systems 130 and ocean-facing cameras 140, one server application 112, and one set of database(s) 114 are illustrated, it should be understood that the infrastructure may comprise any number of user systems, ocean-facing cameras, server applications, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and/or the like.

Platform 110 may comprise web servers which host one or more websites and/or web services. In embodiments in which a website is provided, the website may comprise one or more user interfaces, including, for example, webpages generated in HyperText Markup Language (HTML) or other language. Platform 110 transmits or serves these user interfaces in response to requests from user system(s) 130. In some embodiments, these user interfaces may be served in the form of a wizard, in which case two or more user interfaces may be served in a sequential manner, and one or more of the sequential user interfaces may depend on an interaction of the user or user system with one or more preceding user interfaces. The requests to platform 110 and the responses from platform 110, including the user interfaces, may both be communicated through network(s) 120, which may include the Internet, using standard communication protocols (e.g., HTTP, HTTPS, etc.). These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and/or the like, including elements comprising or derived from data stored in one or more databases (e.g., database(s) 114) that are locally and/or remotely accessible to platform 110. Platform 110 may also respond to other requests from user system(s) 130.

Platform 110 may further comprise, be communicatively coupled with, or otherwise have access to one or more database(s) 114. For example, platform 110 may comprise one or more database servers which manage one or more databases 114. A user system 130 or server application 112 executing on platform 110 may submit data (e.g., user data, form data, etc.) to be stored in database(s) 114, and/or request access to data stored in database(s) 114. Any suitable database may be utilized, including without limitation MySQL™, Oracle™, IBM™, Microsoft SQL™, Sybase™, Access™, and the like, including cloud-based database instances and proprietary databases. Data may be sent to platform 110, for instance, using the well-known POST request supported by HTTP, via FTP, etc. This data, as well as other requests, may be handled, for example, by server-side web technology, such as a servlet or other software module (e.g., server application 112), executed by platform 110.

In an embodiment in which a web service is provided, platform 110 may receive requests from external systems, and provide responses in JavaScript Object Notation (JSON), eXtensible Markup Language (XML), and/or any other suitable or desired format. In such embodiments, platform 110 may provide an application programming interface (API) which defines the manner in which user system(s) 130 and/or external system(s) (e.g., ocean-facing cameras 140) may interact with the web service. Thus, user system(s) 130 and/or the external system(s) (which may themselves be servers), can define their own interfaces, and rely on the web service to implement or otherwise provide the backend processes, methods, functionality, storage, etc., described herein. For example, in such an embodiment, a client application 132 executing on one or more user system (s) 130 may interact with a server application 112 executing on platform 110 to execute one or more or a portion of one or more of the various functions, processes, methods, and/or software modules described herein. Client application 132 may be "thin," in which case processing is primarily carried out server-side by server application 112 on platform 110. A basic example of a thin client application is a browser application, which simply requests, receives, and renders webpages at user system(s) 130, while the server application on platform 110 is responsible for generating the webpages and managing database functions. Alternatively, the client application may be "thick," in which case processing is primarily carried out client-side by user system(s) 130. It should be understood that client application 132 may perform an amount of processing, relative to server application 112, at any point along this spectrum between "thin" and "thick," depending on the design goals of the particular implementation. In any case, the application described herein, which may wholly reside on either platform 110 (e.g., in which case server application 112 performs all processing) or user system(s) 130 (e.g., in which case client application 132 performs all processing) or be distributed between platform 110 and user system(s) 130 (e.g., in which case server application 112 and client application 132 both perform processing), can comprise one or more executable software modules that implement one or more of the processes, methods, or functions of the application(s) described herein.

1.2. Example Processing Device

Figure 2:
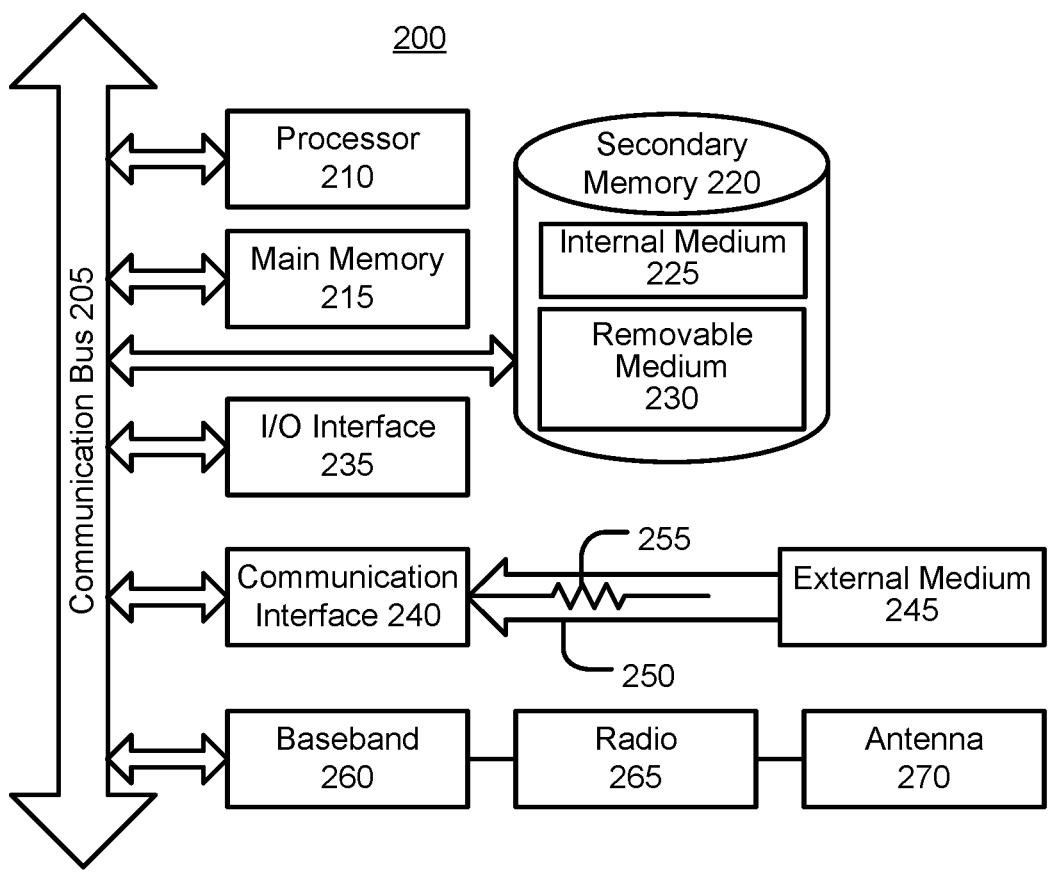
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the mechanisms, processes, methods, or functions (e.g., to store and/or execute the application or one or more software modules of the application) described herein, and may represent components of platform 110, user system(s) 130, ocean-facing camera(s) 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal memory 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, etc. In any case, removable storage medium 230 is a non-transitory computer-readable medium having stored thereon computer-executable code (e.g., disclosed software modules) and/or data. The computer software or data stored on removable storage medium 230 may be read into system 200 for execution by processor 210.

In alternative embodiments, secondary memory 220 may include other similar means for allowing computer programs or other data or instructions to be loaded into system 200. Such means may include, for example, an external storage medium 245 and a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, or any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and other data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs, such as the disclosed application, or software modules) is stored in main memory 215 and/or the secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code (e.g., software and computer programs) to system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable mediums are means for providing executable code, programming instructions, and software to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform the features and functions described elsewhere herein.

In an embodiment, I/O interface 235 provides an interface between one or more components of system 200 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also codes the digital signals for transmission and generates a baseband transmit audio signal that is routed to the modulator portion of radio system 265. The modulator mixes the baseband transmit audio signal with an RF carrier signal generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments. For example, data storage areas 215 or 220 may include various software modules.

1.3. Ocean-Facing Camera

In an embodiment, each ocean-facing camera 140 may comprise a housing with a video camera and system 200. The camera may provide image data to I/O interface 235. The image data may be processed by processor 210 and/or stored in main memory 215 for transmission by communication interface 240, baseband 260, radio 265, and antenna 270. For example, ocean-facing camera 140 may utilize antenna 270 to wirelessly transmit the image data via at least one wireless network (e.g., cellular network, Wi-Fi™ network, etc.) to platform 110. Alternatively, ocean-facing camera 140 may transmit the image data to platform 110 via only wired networks. In either case, the wireless or wired network(s) may form at least a portion of network(s) 120.

2. Process Overview

Embodiments of processes for automated detection of features and/or parameters within an ocean environment will now be described in detail. It should be understood that the described processes may be embodied in one or more software modules that are executed by one or more hardware processors, for example, as the application discussed herein (e.g., server application 112, client application 132, and/or a distributed application comprising both server application 112 and client application 132), which may be executed wholly by processor(s) of platform 110, wholly by processor(s) of user system(s) 130, or may be distributed across platform 110 and user system(s) 130 such that some portions or modules of the application are executed by platform 110 and other portions or modules of the application are executed by user system(s) 130. The described process may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

2.1. Machine-Learning Phase

In an embodiment, the automated detection is performed by a predictive model that is initially trained in a machine-learning phase. The predictive model may continue to be trained as new training data is collected. For example, the predictive model may be trained continuously or at regular intervals.

Figure 3:
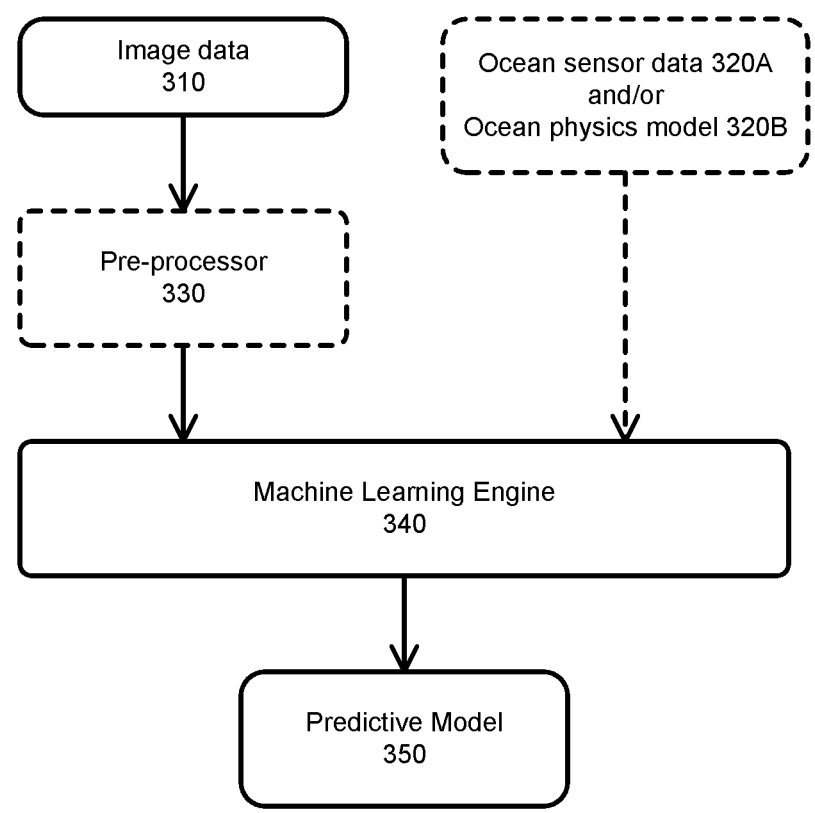
FIG. 3 illustrates a machine-learning process for training a predictive model, according to an embodiment.

FIG. 3 illustrates an embodiment of a process 300 for training a predictive model to automatically detect features and/or parameters of an ocean environment. While process 300 is illustrated with a specific arrangement of steps, in alternative embodiments, process 300 may be implemented with more, fewer, or a different arrangement of steps. Process 300 may be implemented by the disclosed application (e.g., server application 112).

In an embodiment, a machine-learning engine 340 (e.g., within server application 112 on platform 110) receives at least image data 310 as an input. Image data 310 may comprise a plurality of image frames of a video (e.g., webcam video) captured by an ocean-facing camera 140. The video may have been sent by ocean-facing camera 140 (e.g., in real time or near real time) to server application 112 on platform 110 via one or more networks 120. Alternatively, the video used for the machine learning may be historical (i.e., not real time or near real time) video footage of an ocean environment. The image data 310, input to machine-learning engine 340, may additionally or alternatively comprise individual, potentially disassociated or unrelated image(s), instead of a video comprising a plurality of related and sequential image frames. For example, image data 310 may comprise images of people participating in various ocean activities (e.g., surfing, paddling, etc.) that have been gathered by some other means than using ocean-facing camera(s) 140. In any case, image data 310 comprise a plurality of images of or related to an ocean environment.

Prior to being input into machine-learning engine 340, image data 310 may be processed by a pre-processor 330 (e.g., within server application 112 on platform 110). Pre-processor 330 may crop images within the image data 310 (e.g., to remove irrelevant image data, convert the images to a standard size, etc.), apply color filtering, line or edge detection, and/or kernel filtering to the images, utilize a Fourier transformation to convert images into frequency space, create composite images using pixels from consecutive images (e.g., within a video, for example, to enhance contrast), and/or the like.

Either before, during, or after pre-processing by pre-processor 330, but prior to being input into machine-learning engine 340, each of the plurality of images in image data 310 may be annotated to identify features in the image that are relevant to the machine learning. The images may be manually (e.g., by an operator of platform 110) or automatically annotated (e.g., by an object-recognition engine, which may be comprised in pre-processor 330 or some other module before or after pre-processor 330). Features that are annotated in each image may include, without limitation, beachgoers, active recreational activities (e.g., surfing, jet-skiing, paddle-boarding, etc.) of beachgoers, passive recreational activities (e.g., sitting on a surfboard, drifting with a current, etc.) of beachgoers, recreational objects (e.g., surfboards, jet-skis, boats, etc.), waves, wave crests, wave troughs, wave faces, and/or the like.

In an embodiment, machine-learning engine 340 also receives ocean sensor data 320A and/or an ocean physics model 320B as input. However, in an alternative embodiment, machine-learning only receives image data 310 as input, without receiving ocean sensor data 320A and/or ocean physics model 320B as input. In other words, ocean sensor data 320A and/or ocean physics model 320B may be omitted from process 300.

Ocean sensor data 320A may comprise a set of ground-truth values, associated with a particular set of image data 310 (e.g., a particular image or plurality of images within image data 310), that have been captured by an ocean sensor at or around the same time as the particular set of image data 310. In other words, ocean sensor data 320A comprises data collected by ocean sensors contemporaneously with the set of image data 310, and therefore, represents actual conditions in the ocean environment at the time that the set of image data 310 was captured. The ocean sensors, from which ocean sensor data 320A is captured, may include wave buoys and/or seabed-mounted pressure sensors for measuring surface displacement, current meters for measuring ocean currents, thermometers for measuring temperature of the air and/or water, anemometers for measuring wind speed and/or direction, body-worn or body-carried sensors (e.g., sensors being carried by a surfer, sensors within a mobile device being carried by a surfer, etc.), and/or the like. Thus, ocean sensor data 320A may comprise measures of surface displacement, speed and/or direction of ocean currents, air and/or sea temperatures, wind speed and/or direction, and/or any other environmental measure capable of being captured by a sensor. In an embodiment, each of image data 310 and ocean sensor data 320A may be timestamped, so that specific ocean sensor data 320A can be correlated with specific, contemporaneous image data 310 by matching timestamps for each set of data.

Ocean physics model 320B may comprise a Simulating Waves Nearshore (SWAN) model, a Simulating Waves till Shore (SWASH) model, and/or a Nearshore Weather Prediction (NWP) model. These models can be used to predict values of environmental parameters (e.g., a surface flow) that are driven by waves, tides, wind, and/or the like.

Machine-learning engine 340 uses the inputs, including image data 310—and, in an embodiment, ocean sensor data 320A and/or ocean physics model 320B—to train a predictive model 350. Predictive model 350 may comprise an algorithm that predicts measurements in an ocean environment based on image data 310. For example, machine-learning engine 340 may utilize image data 310, with their annotated features, to train predictive model 350 to identify those types of features in non-annotated image data (e.g., based on object detection, or object detection in combination with characteristics of the detected object, for example, over two or more image frames) in the operational phase. Predictive model 350 may further utilize the features, in the operational phase, to predict one or more parameters (e.g., environmental measures).

In an embodiment, machine-learning engine 340 may utilize ocean sensor data 320A and/or ocean physics model 320B in conjunction with the annotated features in image data 310, to train predictive model 350 to more accurately predict parameters, such as environmental measures, based on identified features. For example, if a drifting surfer is an annotated feature in image data 310, machine-learning engine 340 may compute a vector at which the surfer is drifting by measuring a distance that the surfer travels between two or more images within image data (e.g., image frames of a video), divided by an amount of time between when the images were captured (e.g., based on a timestamp or frame rate), and measuring a direction that the surfer is drifting based on a trajectory determined from the two or more images. Machine-learning engine 340 may correlate these images with a contemporaneous measure of the ocean current's speed and direction in ocean sensor data 320A, by matching timestamps associated with the images to timestamps associated with ocean sensor data 320A. Machine-learning engine 340 may then compare the contemporaneous measure of the ocean current's speed and direction to the vector, computed using image data 310, and train the algorithm of predictive model 350 to, when passed the vector as input, output a similar measurement value as the contemporaneous measure of the ocean current's speed and direction. It should be understood that the algorithm may not output the exact value of the contemporaneous measure, but that over a training period, the algorithm will be continually adjusted so that the output values converge as close as possible to the actual contemporaneously measured values.

In a similar manner, predictive model 350 may be trained using ocean sensor data 320A to estimate any variety of other environmental measures. These environmental measures may include, without limitation, wave height, derivations from wave height (e.g., significant wave height, peak period, wave spectra, etc.), wind speed/strength and/or direction, speed/strength and/or location of currents (e.g., rip currents and/or surface currents), quantity, location, and/or height of sand, tide, sea surface and/or storm surge height, and/or the like.

Alternatively or additionally, predictive model 350 may be trained using ocean physics model 320B. Specifically, ocean physics model 320B can utilize wave shapes from image data 310 to derive environmental measures, such as the areas of breaking waves, widths of waves before breaking, direction of travel of breaking areas of waves, and/or the like.

In an alternative embodiment, the machine-learning phase may be omitted, and predictive model 350 may be created without machine learning. For example, feature or object detection, within captured image data during the operational phase, as discussed below, may instead be performed using any conventional feature or object detection technique(s) that do not utilize or require training.

2.2. Operational Phase

In an embodiment in which predictive model 350 is properly trained using image data 310, predictive model 350 will be able to automatically identify features within an ocean environment based only on images of that ocean environment. In the operational phase, these identified features may be used to compute the values of parameters related to those features.

Especially in an embodiment in which predictive model 350 is trained using ocean sensor data 320A and/or ocean physics data 320B, predictive model 350 will also be able to automatically output an accurate estimate of what the measurement values of ocean sensors should be for a given input set of image data of an ocean environment (in addition to or instead of identifying features within the ocean environment). Thus, only the image data of an ocean environment will be needed in the operational phase for predictive model 350 to provide accurate estimates of environmental measures in an ocean environment.

In other words, using trained predictive model 350, image data (e.g., video footage) of an ocean environment will be sufficient to measure environmental conditions that would otherwise need to be measured directly by ocean sensors. Thus, in such an embodiment, ocean-facing camera(s) 140, in conjunction with trained predictive model 350 on platform 110, emulate ocean sensors with quantifiable and verifiable ocean data, thereby obviating the need for ocean sensors. Advantageously, this reduces deployment and maintenance costs, since ocean-facing cameras 140 are easier to install, maintain, and replace than ocean sensors. Indeed, in an embodiment, the disclosed application is configured to utilize existing networks of ocean-facing cameras 140. Furthermore, the use of ocean-facing cameras 140 avoids the problem that ocean sensors may obstruct marine traffic (and therefore, often require permits), and can be easily damaged in the surf zone by breaking waves (e.g., wave buoys cannot be placed in the surf zone for a long-term period, and therefore, cannot be used to measure wave height over time).

In any embodiment, the output of predictive model 350 is accurate even in ocean environments for which it was not explicitly trained. Alternatively, predictive model 350 may be specific to a particular ocean environment.

Figure 4:
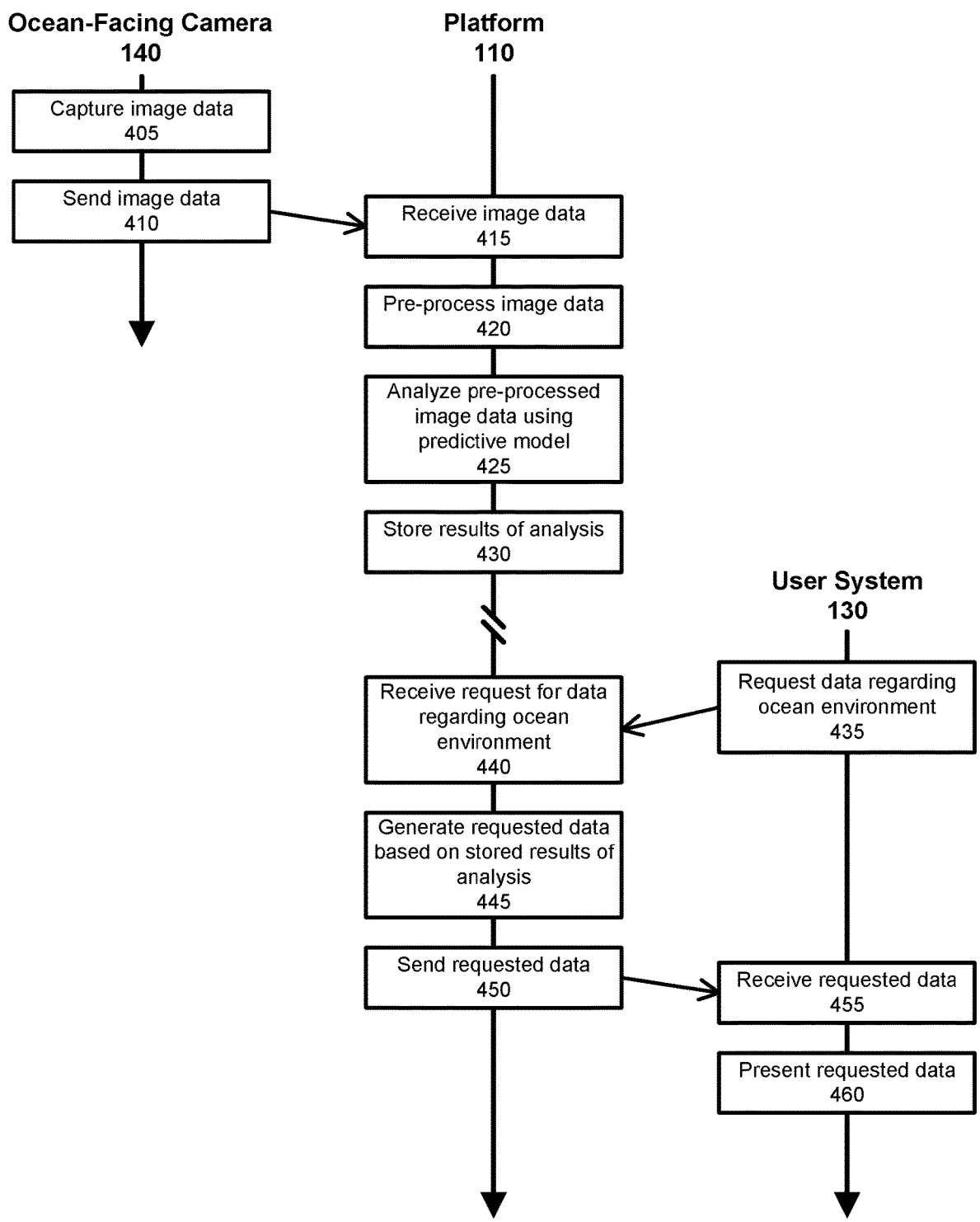
FIG. 4 illustrates a process for using a predictive model to automatically detect features and/or parameters within an ocean environment, according to an embodiment.

FIG. 4 illustrates an embodiment and timing of a process 400 for utilizing predictive model 350 in the operational phase. While process 400 is illustrated with a specific arrangement of steps, in alternative embodiments, process 400 may be implemented with more, fewer, or a different arrangement of steps. As illustrated, steps 405 and 410 are performed by an ocean-facing camera 140 (e.g., by a processor of ocean-facing camera 140 executing firmware or other software on ocean-facing camera 140), steps 415-430 and 440-450 are performed by platform 110 (e.g., by server application 112), and steps 435, 455, and 460 are performed by a user system 130 (e.g., by client application 132).

In step 405, ocean-facing camera 140 captures image data of an ocean environment (e.g., a beach). Specifically, ocean-facing camera 140 may be positioned at an elevated position on a structure (e.g., wall or roof of a beach house, wooden post, cliff face, tree, lamppost, telephone or electrical pole, etc.), such that the camera overlooks a region of the ocean and/or beach. Ocean-facing camera 140 may capture video of the overlooked region at a certain frame rate (e.g., 30 frames per second) or a sequence of still images of the overlooked region at regular intervals (e.g., once a second or every several seconds). It should be understood that the image data, captured in step 405, may be the same kind of data as image data 310 that was used in the machine-learning phase in process 300.

In step 410, ocean-facing camera 140 sends the image data, captured in step 405, to platform 110. Step 410 may be performed in real time as the image data is captured, or may be performed at regular intervals (e.g., every minute) or whenever a certain amount of image data has been captured and queued for transmission (e.g., a certain number of megabytes). The image data may be sent from ocean-facing camera 140 to platform 110, via network(s) 120, using standard wireless or wired communications and/or standard communication protocols (e.g., HTTP, HTTPS, etc.). For example, ocean-facing camera 140 may use a wireless transmitter to transmit the image data to a cellular base station or Wi-Fi™ access point, which may relay the image data through network(s) 120 (e.g., including the Internet) to platform 110.

In step 415, the image data, sent by ocean-facing camera 140, is received at platform 110. The received image data may then be pre-processed in step 420. This pre-processing may be similar or identical to the pre-processing performed by pre-processor 330 during the machine-learning phase in process 300. In an alternative embodiment in which pre-processing is unnecessary, step 420 may be omitted.

In step 425, the image data (pre-processed in step 420, according to an embodiment), is analyzed using predictive model 350.

In an embodiment in which predictive model 350 is used for feature recognition, the image data may be input into predictive model 350, and predictive model 350 may output a representation of recognized features in the image data. For example, the representation of recognized features may comprise, for each image in the image data, a vector representing each recognized feature within the image. Each vector may comprise values representing the feature, such as a type of feature (e.g., drifting surfer, surfing surfer, standing surfer, prostrate surfer, wave, marine life such as dolphins, sharks, whales, seabirds, and/or the like, etc.), a size of the feature, and/or a position of the feature (e.g., relative to a coordinate system common to all the images).

Step 425 may include further analysis on the features. For example, the application may track the position and/or compute the speed of a feature, over time, across a plurality of images. This combination of feature detection and motion tracking allows the application to identify activities, including both passive activities (e.g., a surfer drifting on the ocean surface) and active activities (e.g., a surfer surfing a wave). The types of activities that may be automatically detected by predictive model 350 may include, without limitation, a surfer surfing, a surfer paddling, a surfer sitting or drifting, kite-surfing, jumping while kite-surfing, a kayaker paddling, a kayaker surfing, stand-up paddle surfing, swimming, swimming in a rip current, jet-skiing, boating, more than a certain number of surfers (e.g., ten surfers) within a certain vicinity from each other, a surfer turning on the top of a wave, and/or the like. Based on the identified activities, the application can derive other measures, such as the number of waves surfed per unit time (e.g., per hour), the number of waves surfed per surfer, and/or the like. Over time, these measures can be summarized, for example, into average number of daily swimmers per month, number of days with identified rip currents, and/or the like. Thus, for example, a user can view a summary of the number of waves that have been surfed in a past period of time (e.g., the last hour) to gain insight into the suitability of the waves for surfing.

Step 425 may include further analysis on the features to identify or compute other parameters of the ocean environment. For example, by comparing the feature vectors for a particular wave, across a plurality of images, the application (e.g., server application 112) may calculate the estimated size of the wave. As another example, the application can count the number of a particular feature in one or more images (e.g., the number of waves, the number of surfers, the number of a particular type or species of marine life, etc.). As yet another example, by comparing the feature vectors for a particular feature, such as a drifting surfer, across two or more of the images, the application may calculate an estimated ocean current based on the speed at which the drifting surfer is drifting (e.g., distance traveled by the drifting surfer in the images, divided by a time between the images, as determined, for example, by timestamps or frame rate). In a similar manner, the application may determine one or more of a speed, direction, start time, and/or finish time of surfed waves, number of waves surfed per hour, average number of waves surfed per surfer, average current strength and/or direction, location of the start of the longest surfed waves, area in which most swimmers enter the ocean, average interval between the longest surfed waves, average distance paddled, average paddling speed, average distance paddled per wave, strength and/or location of rip currents, crowd density at different times of the day, most popular time for certain activities (e.g., surfing, kayaking, swimming, etc.), number of boats and/or jet-skis moving through the region, average and/or maximum speed of boat traffic, and/or the like.

In an embodiment in which predictive model 350 is also used for emulating an ocean sensor or ocean physics model (e.g., in an embodiment in which predictive model 350 is trained in the machine-learning phase using ocean sensor data 320A and/or ocean physics model 320B), predictive model 350 may additionally or alternatively output estimated environmental measures. Advantageously, in the operational phase of predictive model 350, these estimated environmental measures are derived from the image data alone, obviating the need for ocean sensors. Examples of environmental measures that may be estimated by predictive model 350 include, without limitation, wave height, wave spectra, wave peak period, wave significant height, distribution of wave heights over time, frequency of occurrence of wave groups, wave shape, location of areas of breaking waves, direction of breaking waves, speed of breaking waves, surface current speed, strength, and/or direction, wind speed, strength, and/or direction, frequency of wind gusts, tide level, beach run-up and overtopping (i.e., waves surging up the sand or over it), coastal flooding, location and/or distribution of submerged sand bars and reefs, and/or the like.

In step 430, the results of step 425 may be stored (e.g., in database 114, in either volatile or non-volatile memory) in association with an identifier of the ocean environment that is associated with the ocean-facing camera 140 from which the image data was received in step 415. As discussed above, these results may comprise information about features of the ocean environment (e.g., number of surfers) and/or parameter values (e.g., wave height, speed and direction of surface currents, etc.). The results may be stored so as to be retrievable (e.g., indexed by an identifier of the associated ocean environment) in response to user requests.

Steps 405-430 of process 400 may be repeated for a plurality of ocean-facing cameras 140 and/or for a plurality of ocean environments, such that results are stored for each of the plurality of ocean environments. In addition, it should be understood that steps 405-410 and/or 415-430 may be performed continuously and in real time or near real time for any given ocean-facing camera 140.

For ease of understanding, steps 435-460 of process 400 have been illustrated as occurring subsequent to steps 405-430. However, in reality, steps 435-460 may be performed simultaneously, contemporaneously, and/or subsequently with any of steps 405-430. In fact, steps 435-460 are independent from steps 405-430, except to the extent that they access data produced by step 425 and/or stored in step 430.

In step 435, user system 130 requests data regarding one or more ocean environments. User system 130 may generate this request in response to a user operation. For example, a user may utilize a graphical user interface, displayed on the display of user system 130 by client application 132, to select one or more ocean environments (e.g., by name, location, or other identifier) and, potentially, specific information (e.g., specific features and/or parameters) about the selected ocean environment(s). Thus, the user can select a number of beaches and specify that he or she would like to see the wave height and/or wave frequency at those beaches. In an embodiment, the graphical user interface is a webpage (e.g., generated in HTML, in which case client application 132 may be a web browser or a mobile app that displays webpages). Alternatively, the graphical user interface may comprise one or more screens generated and displayed directly by a mobile app. In any case, it should be understood that the request may be sent from user system 130 to platform 110, via network(s) 120, using standard wireless or wired communications and/or standard communication protocols (e.g., HTTP, HTTPS).

In step 440, platform 110 receives the request from user system 130. The request may comprise an identifier for each of one or more ocean environments (e.g., beaches), an identifier of the type of information being requested, and/or a time frame (e.g., date and/or time range) for which the information is being requested.

In step 445, in response to the request received in step 440, platform 110 generates the requested data based on stored results of one or more analyses perform in step 425. For example, server application 112 may retrieve results for each ocean environment, specified in the request, and derive the requested data from the retrieved results. In the event that the request, received in step 440, comprises a time frame, the results from that time frame may be used to derive the requested data. In this manner, the user may request data for a past time period (e.g., yesterday morning between 6:00 a.m. to 8:00 a.m.). Alternatively, or if the request does not specify a time frame, the requested data may be derived from the most current stored results. In this case, the requested data can be derived from real-time results of the analysis in step 425 (e.g., even without the results being persistently stored, thereby omitting step 430).

In step 450, platform 110 responds to the request, received in step 440, by sending the requested data to user system 130. This response may comprise the requested data in any format, including HTML, XML, JSON, and/or the like. It should be understood that the response may be sent from platform 110 to user system 130, via network(s) 120, using standard wireless or wired communications and/or standard communication protocols (e.g., HTTP, HTTPS).

In step 455, user system 130 receives the response from platform 110.

In step 460, user system 130 may present the requested data, included in the response received in step 455, to the user. Presenting the requested data may comprise parsing the response to extract the requested data and displaying the extracted data in a graphical user interface, presented by client application 132, on the display of user system 130. In an embodiment in which the response is a webpage (e.g., generated in HTML), step 460 may comprise displaying the webpage in a browser or mobile app that is executing on user system 130. Alternatively, in an embodiment in which client application 132 is a mobile app, the mobile app may locally generate a graphical user interface based on the requested data, and display the graphical user interface on the display of user system 130. In any case, the graphical user interface may comprise content (e.g., text, images, video, animations, charts, graphs, etc.) to convey the requested data (e.g., features and/or parameters of one or more ocean environments), as well as one or more inputs (e.g., links, virtual buttons, checkboxes, radio buttons, textboxes, etc.) that enable the user to interact with the content and/or further communicate with platform 110.

Alternatively or additionally to the request-and-response example described by steps 435-455, data regarding the ocean environment may be broadcast or otherwise "pushed" to one or more user systems 130. In other words, instead of responding to requests or in addition to responding to requests from user system(s) 130, platform 110 may automatically, on its own initiative, generate data, based on the results of the analysis stored in step 430, and send that data to one or more user systems 130. The data may be generated in the same manner as in step 445, based on one or more criteria (e.g., identifier of the ocean environment, type of information, time frame, etc.) defined by platform 110 and/or previously defined by a user of each user system 130, and may be sent, received, and presented in the same manner as in steps 450, 455, and 460, respectively. The data may be generated and sent periodically (e.g., every five minutes or according to some other platform-defined and/or user-defined interval) and/or in response to some triggering event (e.g., a platform-defined and/or user-defined change in the value of an environmental parameter of an ocean environment, the value of an environmental parameter of an ocean environment crossing a platform-defined and/or user-defined threshold, etc.).

3. Example Uses

Some exemplary, non-limiting uses of trained predictive model 350 will now be described in detail.

3.1. Image Data Retrieval

In an embodiment, platform 110 may store the image data received from ocean-facing cameras 140 (e.g., the image data received in step 415 of process 400). The image data may be stored in its raw format (e.g., before step 420) or in its pre-processed format (e.g., after step 420), and may be indexed so as to be retrievable by the ocean environment from which it was captured and/or the time at which it was captured. A user may request the image data via user system 130 (e.g., via a request that is similar or identical to the request sent in step 435), and platform 110 may respond with the image data (e.g., via a response that is similar or identical to the response sent in step 450). Thus, for example, the user may view video footage of a particular beach at a particular time or time period that has been captured by one or more of ocean-facing cameras 140. In this manner, a recreational user (e.g., surfer) may quickly and easily retrieve video footage of his or her performance at the particular beach and at the particular time or time period for educational or entertainment purposes.

In an embodiment, in which image data is stored by platform 110, the image data may be automatically correlated to recreational activities—examples of which are listed elsewhere herein—that have been identified using predictive model 350. For example, in the operational phase, predictive model 350 may receive the image data as input, identify features within the image data, and identify recreational activities (e.g., surfing, jet-skiing, paddle-boarding, etc.) from the features. For instance, predictive model 350 may identify a first feature of a person standing on a surfboard, and, based on the occurrence of this first feature in one or more images in the image data—possibly in conjunction with a second feature (e.g., a feature of a wave in the vicinity of the first feature) or attribute of the first feature (e.g., speed and/or direction of the first feature)—identify an instance of surfing. Any recreational activities that are identified by predictive model 350 may be stored in association with the image data in which it was identified, such that the image data is retrievable based on the recreational activities. Thus, a user may request and view image data that is associated with specific activities of interest to the user.

The graphical user interface displayed at user system 130 (e.g., by client application 132) may comprise one or more inputs, by which the user can select particular activities of interest, a particular location (e.g., beach and/or region of a beach) of interest, and/or a time frame (e.g., date and time or time range) of interest.

Using the graphical user interface, the user may retrieve video footage of surfing activities at a particular beach and/or at or within a particular timeframe. In an embodiment, the user can view recorded video footage of the most recent N (e.g., five) waves that have been surfed at a particular beach. This may allow the user to gain a clear idea of the size of the waves that are being surfed. It should be understood that the video footage may be viewed in conjunction with a summary of estimated parameters (e.g., estimated by step 425 of process 400 based on image data) of the particular beach (e.g., the number of waves that have been surfed in the last hour).

In an embodiment, the image data from an ocean-facing camera 140 may be retrieved in real time, such that a user at a user system 130 may view real-time video footage of a region being captured by the ocean-facing camera 140.

Whether past or real-time image data is retrieved for viewing by a user, in an embodiment, the retrieved image data (e.g., video footage or still images) may be automatically edited (e.g., cropped, spliced, annotated, etc.) to present or highlight certain activities (e.g., activities specified by the user) to the user.

3.2. Automated Tracking

In an embodiment, each ocean-facing camera 140 may be configured to automatically move (e.g., swivel or rotate along one or more axes) in order to track activities identified in the captured image data. Server application 112 on platform 110 may send commands to an ocean-facing camera 140, and the ocean-facing camera 140 may initiate a movement of its camera or housing in response to the commands sent by server application 112.

In an embodiment, server application 112 may control one or more ocean-facing cameras 140 (e.g., using commands) to track particular types of activities that have been identified, at platform 110, by predictive model 350. For example, if predictive model 350 identifies a wave in the image data from a particular ocean-facing camera 140, server application 112 may control that ocean-facing camera 140 to move the camera or housing so that the wave remains centered within the camera's field of view. Similarly, server application 112 may control the ocean-facing camera 140 to move the camera or housing so that a location, at which the most surfed waves have been forming (e.g., as identified using predictive model 350), remains centered within the camera's field of view.

In an embodiment in which predictive model 350 is able to distinguish between different individuals engaging in recreational activities, an ocean-facing camera 140 may be automatically moved to track the individual as he or she engages in the recreational activity. Tracking a specific individual, in this manner, can help with the understanding of connected events. For example, in an embodiment, platform 110 is configured to provide edited video of all waves surfed by a single individual (e.g., in response to a user request) and/or compute the distance paddled by a single individual in a single session.

3.3. Alerts

In an embodiment, the application may alert users when certain criteria are met. The criteria to be used for the alerts may be set by the operator of platform 110 and/or the user of user system 130. In an embodiment, the operator may specify a default set of criteria, and the user may add, remove, or modify the default set of criteria.

Whenever the criteria associated with a given user's alert is satisfied, server application 112 may instruct client application 132 (e.g., via a command sent over network(s) 120) to provide an alert to the user. Upon receiving the instruction, client application 132 may provide an audio, haptic, and/or visual alert (e.g., within a graphical user interface of client application 132) that conveys the subject of the alert.

Alternatively or additionally, server application 112 may alert users by sending or initiating the transmission of text or multimedia messages (e.g., using Short Message Service (SMS) and/or Multimedia Messaging Service (MMS)), email messages, and/or instant messages.

Examples of alerts may include, without limitation, more than twenty waves per hour are being surfed at a particular beach (e.g., near the user's location, or previously specified by the user as a beach of interest), a kite surfer has executed a jump of more than fifty feet at a specific ocean location, a swimmer appears to be drifting rapidly in a rip current, a measure of waves surfed per surfer exceeds a threshold, the absence of any surfers (or the number of surfers being below a predetermined threshold) at a particular beach, and/or the like.

3.4. Water Sport Competitions

In an embodiment, the application can be utilized for a competition in water sports, by having one or more ocean-facing camera(s) 140 positioned to capture image data of a region in which the competition is being held. Using a surf competition as an example, predictive model 350 may be used in the same manner as described elsewhere herein to compute the number of rides per surfer in a contest heat, identify start and/or stop times for surfed waves in a contest heat, automatically annotate video of a contest heat (e.g., with the identified start and/or stop times), identify ride length per surfer per wave, and/or compute ride lengths and/or speeds.

3.5. Combination with Meteorological Data

In an embodiment, the output of predictive model 350 can be combined with meteorological data (e.g., offshore data, observation data, etc.) to produce a predictive model that receives image data and meteorological data and outputs a prediction, such as the predicted number of surfed waves per hour based on wave features detected in the image data and a weather forecast, the predicted crowd level based on wave features detected in the image data and a weather forecast, and/or the predicted risk of rip currents based on wave features detected in the image data and a weather forecast.

3.6. Analytics

In an embodiment, the output of predictive model 350 can be used to generate data sets that summarize recreational ocean activity over time and region. This can inform the research and development of consumer products, business-to-business data sales, and/or the like. For example, data sets collected over a long-term period can be used to generate statistical summaries of seasonal conditions, the return rates or risks of certain types of events (e.g., competitions), and/or the like.

3.7. Combination with User Data

In an embodiment, the real-time image data of a particular ocean environment, captured by ocean-facing camera(s) 140, may be augmented with real-time user data, captured by users of the application who are within that particular ocean environment. The user data may be captured by mobile user system(s) 130 being carried by one or more users. These mobile user system(s) 130 may comprise a smartphone, a smart watch or other wearable device, and/or the like. For example, a mobile user system 130 may comprise a Global Positioning System (GPS) sensor which collects location data and/or an acceleration sensor which collects acceleration data. As a user drifts or surfs in the ocean environment, while wearing such a mobile user system 130, the mobile user system 130 may collect location data (e.g., GPS coordinates) and/or acceleration data (e.g., the number, frequency, and/or magnitude of the rises and falls of the user) and transmit it (e.g., wirelessly, in real time, using antenna 270) to platform 110, to be used to train predictive model 350 in the machine-learning phase and/or as input to predictive model 350 in the operational phase. The location data and/or acceleration data may be used to determine the user's speed (e.g., to determine the speed and/or strength of currents), how often and far the user is rising and falling (e.g., to determine wave height, wave frequency, wave strength, how often the surfer is riding a wave, etc.), and/or the like.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   for each of one or more cameras that are positioned to capture image data of a region of a water environment,
      receive the captured image data via at least one network,
      identify one or more waves within the captured image data using a machine-learning engine that has been trained on annotated image data to identify waves in the captured image data, wherein identifying one or more waves comprises detecting a wave crest, and
      measure one or more parameters of the region based on the identified one or more waves; and,
   for each of one or more user systems,
      receive a request for data from the user system via the at least one network,
      generate the requested data based on the one or more parameters, and
      send the requested data to the user system via the at least one network.

2. A method comprising using at least one hardware processor to:
   for each of one or more cameras that are positioned to capture image data of a region of a water environment,
      receive the captured image data via at least one network,
      identify one or more waves within the captured image data using a machine-learning engine that has been trained on annotated image data to identify waves in the captured image data, wherein identifying one or more waves comprises detecting a wave trough, and
      measure one or more parameters of the region based on the identified one or more waves; and,
   for each of one or more user systems,
      receive a request for data from the user system via the at least one network,
      generate the requested data based on the one or more parameters, and
      send the requested data to the user system via the at least one network.

3. A method comprising using at least one hardware processor to:
   for each of one or more cameras that are positioned to capture image data of a region of a water environment,
      receive the captured image data via at least one network,
      identify one or more waves within the captured image data using a machine-learning engine that has been trained on annotated image data to identify waves in the captured image data, wherein identifying one or more waves comprises detecting a wave face, and
      measure one or more parameters of the region based on the identified one or more waves; and,
   for each of one or more user systems,
      receive a request for data from the user system via the at least one network,
      generate the requested data based on the one or more parameters, and
      send the requested data to the user system via the at least one network.

4. A method comprising using at least one hardware processor to:
   for each of one or more cameras that are positioned to capture image data of a region of a water environment,
      receive the captured image data via at least one network,
      identify one or more waves within the captured image data using a machine-learning engine that has been trained on annotated image data to identify waves in the captured image data, and
      measure one or more parameters of the region based on the identified one or more waves, wherein the one or more parameters comprise a wave height; and,
   for each of one or more user systems,
      receive a request for data from the user system via the at least one network,
      generate the requested data based on the one or more parameters, and
      send the requested data to the user system via the at least one network.

5. The method of claim 4, wherein the wave height comprises a significant wave height in the region.

6. The method of claim 4, wherein the wave height comprises an average wave height in the region.

7. A method comprising using at least one hardware processor to:
   for each of one or more cameras that are positioned to capture image data of a region of a water environment,
      receive the captured image data via at least one network,
      identify one or more waves within the captured image data using a machine-learning engine that has been trained on annotated image data to identify waves in the captured image data, and measure one or more parameters of the region based on the identified one or more waves, wherein the one or more parameters comprise wave spectra; and, for each of one or more user systems,
receive a request for data from the user system via the at least one network,
generate the requested data based on the one or more parameters, and
send the requested data to the user system via the at least one network.

8. A method comprising using at least one hardware processor to:
for each of one or more cameras that are positioned to capture image data of a region of a water environment,
receive the captured image data via at least one network,
identify one or more waves within the captured image data using a machine-learning engine that has been trained on annotated image data to identify waves in the captured image data, and
measure one or more parameters of the region based on the identified one or more waves, wherein the one or more parameters comprise a peak wave period; and,
for each of one or more user systems,
receive a request for data from the user system via the at least one network,
generate the requested data based on the one or more parameters, and
send the requested data to the user system via the at least one network.

9. A method comprising using at least one hardware processor to:
for each of one or more cameras that are positioned to capture image data of a region of a water environment,
receive the captured image data via at least one network,
identify one or more waves within the captured image data using a machine-learning engine that has been trained on annotated image data to identify waves in the captured image data, and
measure one or more parameters of the region based on the identified one or more waves, wherein the one or more parameters comprise a width of a wave before breaking; and,
for each of one or more user systems,
receive a request for data from the user system via the at least one network,
generate the requested data based on the one or more parameters, and
send the requested data to the user system via the at least one network.

10. A method comprising using at least one hardware processor to:
for each of one or more cameras that are positioned to capture image data of a region of a water environment,
receive the captured image data via at least one network,
identify one or more waves within the captured image data using a machine-learning engine that has been trained on annotated image data to identify waves in the captured image data, and
measure one or more parameters of the region based on the identified one or more waves, wherein the one or more parameters comprise a direction of a wave; and,
for each of one or more user systems,
receive a request for data from the user system via the at least one network,
generate the requested data based on the one or more parameters, and
send the requested data to the user system via the at least one network.

11. The method of claim 10, wherein the one or more parameters comprise a direction of surfed waves in the region.

12. A method comprising using at least one hardware processor to:
for each of one or more cameras that are positioned to capture image data of a region of a water environment,
receive the captured image data via at least one network,
identify one or more waves within the captured image data using a machine-learning engine that has been trained on annotated image data to identify waves in the captured image data, and
measure one or more parameters of the region based on the identified one or more waves, wherein the one or more parameters comprise a number of waves in the region; and,
for each of one or more user systems,
receive a request for data from the user system via the at least one network,
generate the requested data based on the one or more parameters, and
send the requested data to the user system via the at least one network.

13. A method comprising using at least one hardware processor to:
for each of one or more cameras that are positioned to capture image data of a region of a water environment,
receive the captured image data via at least one network,
identify one or more waves within the captured image data using a machine-learning engine that has been trained on annotated image data to identify waves in the captured image data, and
measure one or more parameters of the region based on the identified one or more waves, wherein the one or more parameters comprise a speed of a wave; and,
for each of one or more user systems,
receive a request for data from the user system via the at least one network,
generate the requested data based on the one or more parameters, and
send the requested data to the user system via the at least one network.

14. A method comprising using at least one hardware processor to:
for each of one or more cameras that are positioned to capture image data of a region of a water environment,
receive the captured image data via at least one network,
identify one or more waves within the captured image data using a machine-learning engine that has been trained on annotated image data to identify waves in the captured image data, and
measure one or more parameters of the region based on the identified one or more waves, wherein the one or more parameters comprise one or both of a number of waves surfed per unit time in the region or a number of waves surfed per surfer in the region; and,
for each of one or more user systems, receive a request for data from the user system via the at least one network, generate the requested data based on the one or more parameters, and send the requested data to the user system via the at least one network.

15. A method comprising using at least one hardware processor to:

for each of one or more cameras that are positioned to capture image data of a region of a water environment, receive the captured image data via at least one network, identify one or more waves within the captured image data using a machine-learning engine that has been trained on annotated image data to identify waves in the captured image data, and measure one or more parameters of the region based on the identified one or more waves, wherein the one or more parameters comprise one or more of a location in the region at which longest surfed waves originated, an average interval between surfed waves in the region, or an average distance paddled by surfers per wave in the region; and, for each of one or more user systems, receive a request for data from the user system via the at least one network, generate the requested data based on the one or more parameters, and send the requested data to the user system via the at least one network.

16. A method comprising using at least one hardware processor to:

for each of one or more cameras that are positioned to capture image data of a region of a water environment, receive the captured image data via at least one network, identify one or more waves within the captured image data using a machine-learning engine that has been trained on annotated image data to identify waves in the captured image data, and measure one or more parameters of the region based on the identified one or more waves; and, for each of one or more user systems, receive a request for data from the user system via the at least one network, wherein the request for data indicates a time frame, generate the requested data based on the one or more parameters, wherein the requested data is generated based on the one or more parameters measured for image data captured during the time frame, and send the requested data to the user system via the at least one network.

17. A method comprising using at least one hardware processor to:

for each of one or more cameras that are positioned to capture image data of a region of a water environment, receive the captured image data via at least one network, identify one or more waves within the captured image data using a machine-learning engine that has been trained on annotated image data to identify waves in the captured image data, and measure one or more parameters of the region based on the identified one or more waves;

for each of one or more user systems, receive a request for data from the user system via the at least one network, generate the requested data based on the one or more parameters, and send the requested data to the user system via the at least one network; and, for at least one user system, when the one or more parameters satisfy one or more predefined criteria, send an alert to a user of the at least one user system.

18. A system comprising:

at least one hardware processor; and one or more software modules configured to, when executed by the at least one hardware processor, for each of one or more cameras that are positioned to capture image data of a region of a water environment, receive the captured image data via at least one network, identify one or more waves within the captured image data using a machine-learning engine that has been trained on annotated image data to identify waves in the captured image data, and measure one or more parameters of the region based on the identified one or more waves, wherein the one or more parameters comprise a wave height, and, for each of one or more user systems, receive a request for data from the user system via the at least one network, generate the requested data based on the one or more parameters, and send the requested data to the user system via the at least one network.

19. A non-transitory computer-readable medium having instructions stored therein, wherein the instructions, when executed by a processor, cause the processor to:

for each of one or more cameras that are positioned to capture image data of a region of a water environment, receive the captured image data via at least one network, identify one or more waves within the captured image data using a machine-learning engine that has been trained on annotated image data to identify waves in the captured image data, and measure one or more parameters of the region based on the identified one or more waves, wherein the one or more parameters comprise a wave height; and, for each of one or more user systems, receive a request for data from the user system via the at least one network, generate the requested data based on the one or more parameters, and send the requested data to the user system via the at least one network.

* * * * *